United States Patent
Polasa et al.

(10) Patent No.: US 12,164,610 B2
(45) Date of Patent: Dec. 10, 2024

(54) SYSTEM AND METHOD FOR INTERCONNECTION, TRANSLATION AND TRANSITION BETWEEN DISPARATE DIGITAL ECOSYSTEMS

(71) Applicant: BANK OF AMERICA CORPORATION, Charlotte, NC (US)

(72) Inventors: Puneetha Polasa, Telangana (IN); Saurabh Arora, Gurugram (IN); Sandeep Kumar Chauhan, Hyderabad (IN); Bhagya Lakshmi Sudha Lavanya Mallidi, Hyderabad (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 220 days.

(21) Appl. No.: 17/873,914

(22) Filed: Jul. 26, 2022

(65) Prior Publication Data
US 2024/0037196 A1 Feb. 1, 2024

(51) Int. Cl.
G06F 21/31 (2013.01)
G06F 11/34 (2006.01)

(52) U.S. Cl.
CPC .......... *G06F 21/31* (2013.01); *G06F 11/3438* (2013.01)

(58) Field of Classification Search
CPC ............................ G06F 21/31; G06F 11/3438
See application file for complete search history.

(56) References Cited

U.S. PATENT DOCUMENTS

| | | |
|---|---|---|
| 7,467,356 B2 | 12/2008 | Gettman et al. |
| 8,397,168 B2 | 3/2013 | Leacock et al. |
| 8,671,349 B2 | 3/2014 | Hamilton, II et al. |
| 8,907,983 B2 | 12/2014 | Mcardle et al. |
| 9,563,902 B2 | 2/2017 | Haswell et al. |
| 10,108,972 B2 | 10/2018 | Gershfang et al. |
| 10,902,437 B2 | 1/2021 | Bhogal et al. |
| 10,991,165 B2 | 4/2021 | Altieri |
| 11,962,580 B2 * | 4/2024 | Gero ................ H04L 63/08 |
| 2001/0019337 A1 | 9/2001 | Kim |
| 2009/0089364 A1 | 4/2009 | Hamilton, II et al. |
| 2009/0235191 A1 | 9/2009 | Garbow et al. |
| 2010/0199200 A1 | 8/2010 | Fujioka |
| 2010/0228633 A1 | 9/2010 | Guimares et al. |
| 2010/0269151 A1 * | 10/2010 | Crume .............. H04L 9/3226 726/2 |

(Continued)

*Primary Examiner* — Raqiul A Choudhury
(74) *Attorney, Agent, or Firm* — Moore & Van Allen PLLC; Anoohya Yarlagadda

(57) ABSTRACT

Embodiments of the present invention provide a system for interconnection, translation, and transition between disparate digital ecosystems. The system is configured for determining that a user is requesting to access a first digital ecosystem, receiving a first authentication credentials of the user from the first digital ecosystem for verification, determining that the verification of the first authentication credentials is successful and provide access to the first digital ecosystem, determining that the user is requesting transition to a second digital ecosystem from the first digital ecosystem, receiving second authentication credentials of the user from the second digital ecosystem for verification, determining that the verification of the second authentication credentials is successful and provide access to the second digital ecosystem, and preparing and transmitting a data payload to the second digital ecosystem.

20 Claims, 6 Drawing Sheets

(56) References Cited

U.S. PATENT DOCUMENTS

| | | |
|---|---|---|
| 2011/0231305 A1* | 9/2011 | Winters ............... G06Q 20/384 |
| | | 705/1.1 |
| 2012/0198359 A1 | 8/2012 | Lossia |
| 2014/0082526 A1* | 3/2014 | Park ...................... H04L 65/403 |
| | | 715/757 |
| 2014/0090035 A1* | 3/2014 | Kodama ................. G06F 21/36 |
| | | 726/6 |
| 2014/0189808 A1* | 7/2014 | Mahaffey ............ G06F 21/6245 |
| | | 726/4 |
| 2016/0098789 A1* | 4/2016 | Berntsson .............. G06Q 10/02 |
| | | 705/35 |
| 2019/0156575 A1 | 5/2019 | Korhonen |
| 2020/0020172 A1 | 1/2020 | Rogers et al. |
| 2021/0141853 A1* | 5/2021 | Whitney ............... G06F 16/986 |
| 2021/0304510 A1 | 9/2021 | Rogers et al. |
| 2023/0162736 A1* | 5/2023 | Jo ........................... G09B 9/00 |
| | | 704/235 |

\* cited by examiner

SYSTEM AND METHOD FOR INTERCONNECTION, TRANSLATION AND TRANSITION BETWEEN DISPARATE DIGITAL ECOSYSTEMS

BACKGROUND

Conventional systems do not have the capability to allow translation between disparate digital ecosystems. As such, there exists a need for a system that allows for interconnection, translation, and transition between disparate digital ecosystems.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for interconnection, translation, and transition between disparate digital ecosystems. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention determines that a user is requesting to access a first digital ecosystem, via a user device, receives a first authentication credentials of the user from the first digital ecosystem for verification, determines that the verification of the first authentication credentials is successful and provide access to the first digital ecosystem, determines that the user is requesting transition to a second digital ecosystem from the first digital ecosystem, via the user device, receives second authentication credentials of the user from the second digital ecosystem for verification, determines that the verification of the second authentication credentials is successful and provide access to the second digital ecosystem, and prepares and transmits a data payload to the second digital ecosystem, wherein the data payload comprises at least user activity information of the user from the first digital ecosystem.

In some embodiments, the present invention prepares the data payload based on monitoring user activity of the user in the first digital ecosystem, storing the user activity as the user activity information, communicating with one or more other systems to gather data associated with the user related to the user activity, and packaging at least the user activity information and the data gathered from the one or more other systems as the data payload.

In some embodiments, the present invention prepares the data payload in a Metaverse Interface Definition Language (MIDL) format, wherein the MIDL format allows for efficient translation of data between one or more digital ecosystems.

In some embodiments, the present invention registers one or more users in one or more digital ecosystems.

In some embodiments, the present invention registers the one or more user in the one or more digital ecosystems based on receiving a first set of credentials comprising at least a first user ID, a first avatar, and a first authentication information for accessing the first digital ecosystem from the user, receiving a second set of credentials comprising at least a second user ID, a second avatar, and a second authentication information for accessing the second digital ecosystem from the user, generating a meta ID for the user, and tagging the first set of credentials and the second set of credentials with the meta ID.

In some embodiments, the present invention verifies the first authentication credentials based on determining that the first authentication credentials match the first set of credentials tagged with the meta ID of the user.

In some embodiments, the present invention verifies the second authentication credentials based on determining that the second authentication credentials match the second set of credentials tagged with the meta ID of the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
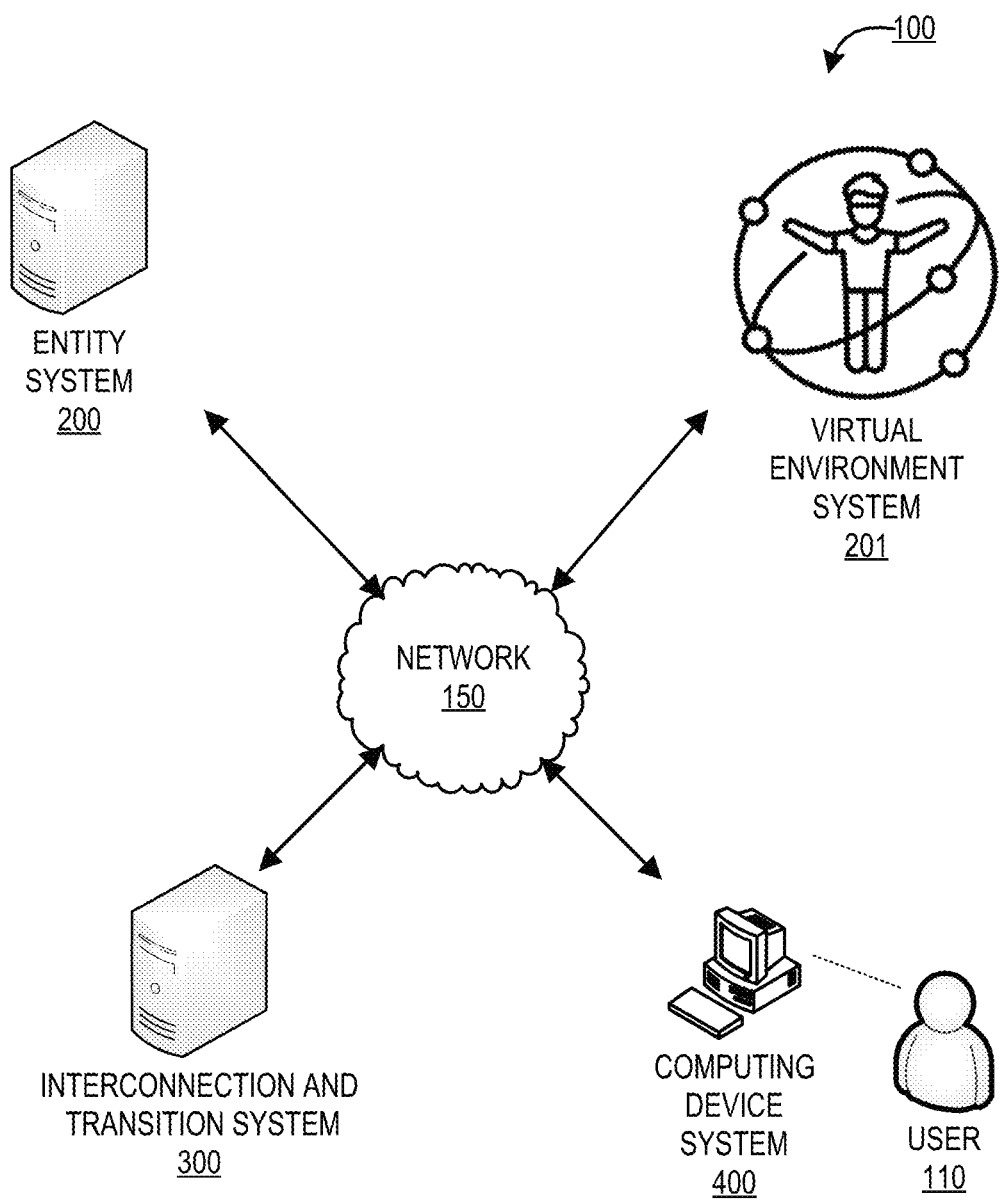
Figure 2:
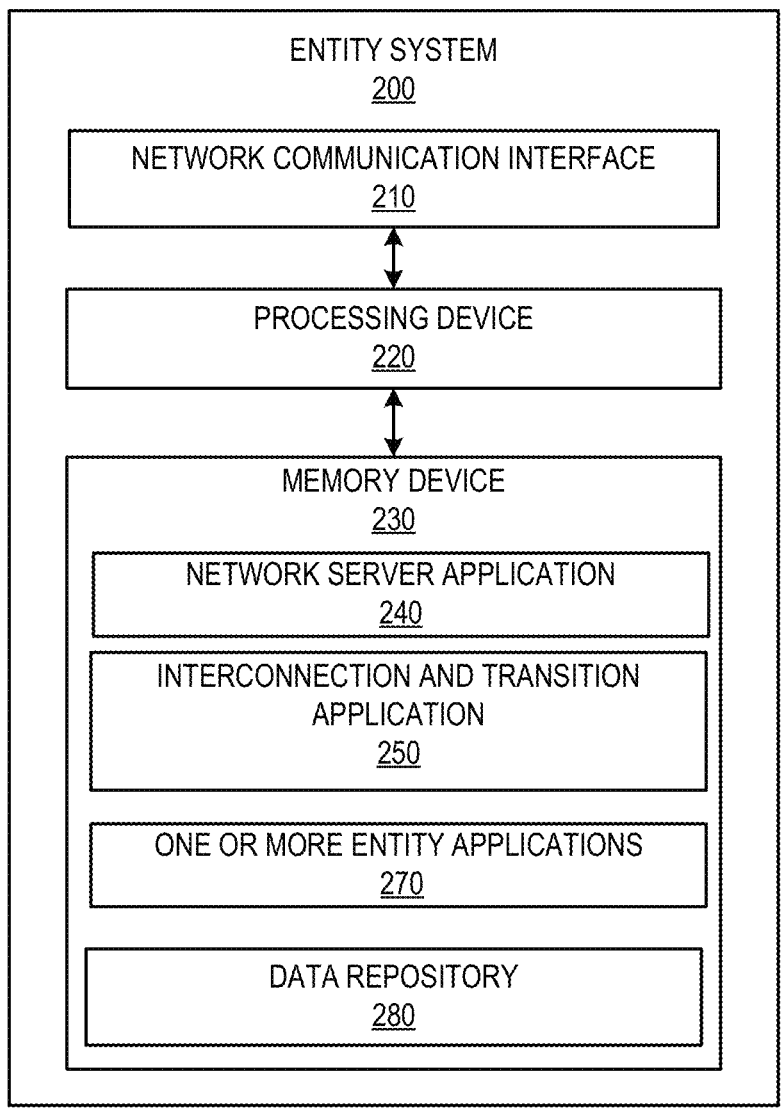
Figure 3:
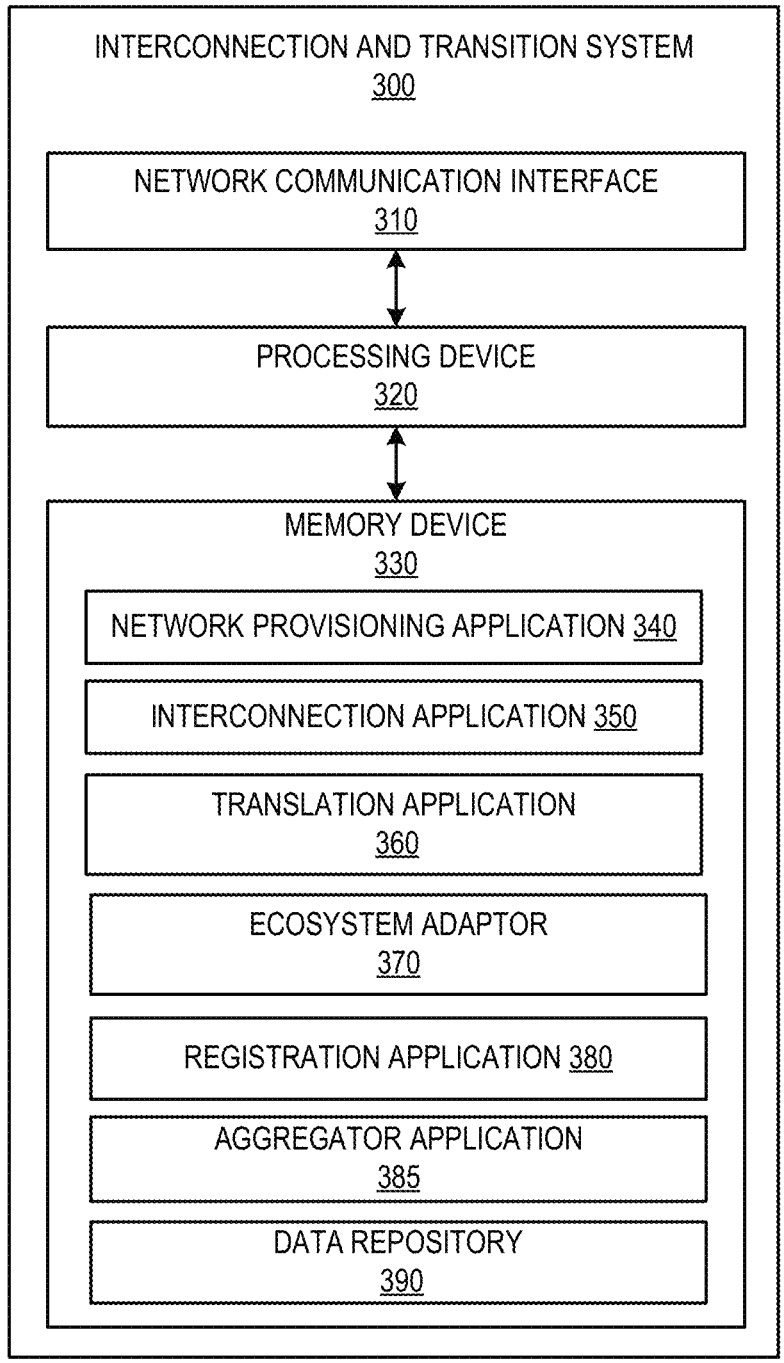
Figure 4:
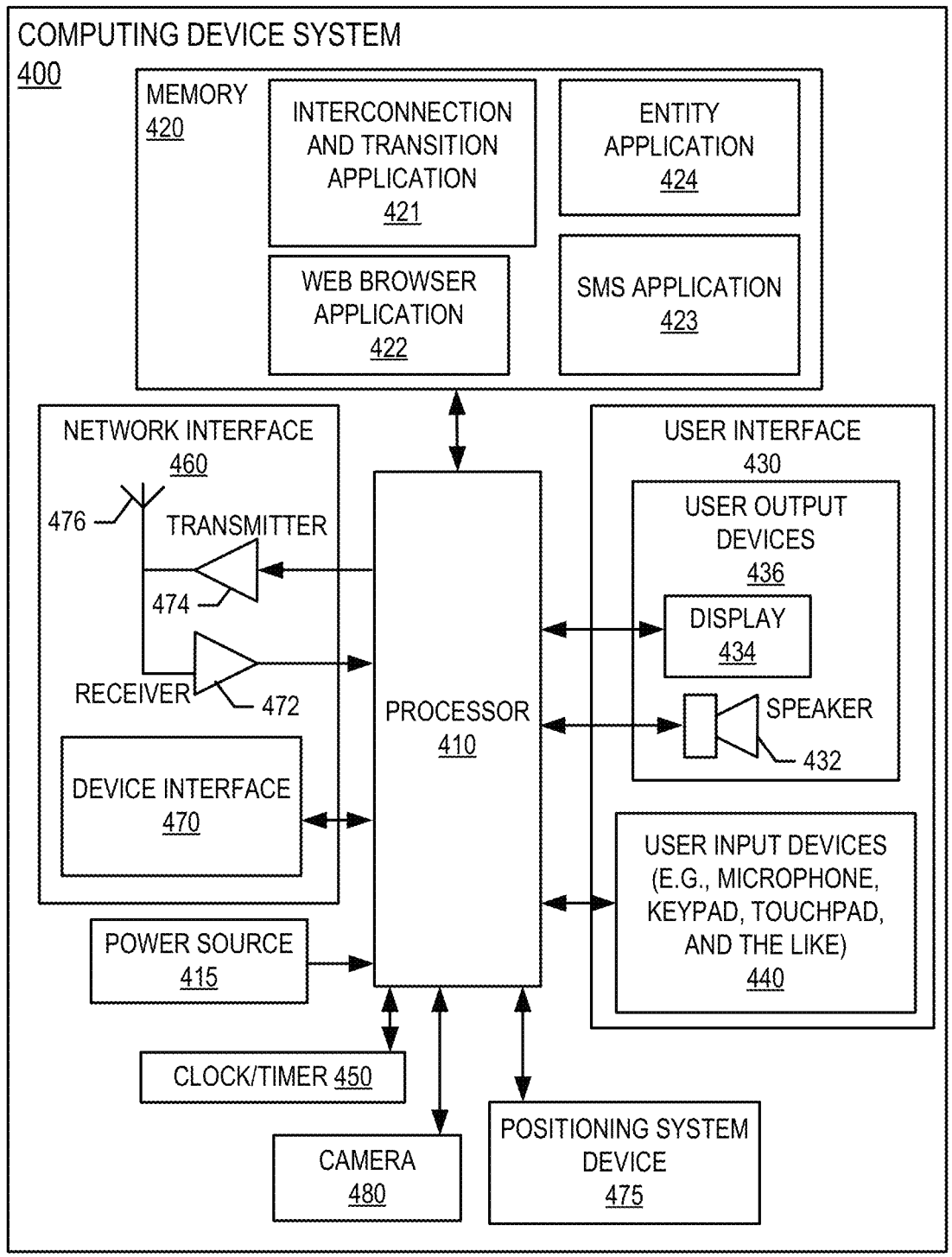
Figure 5:
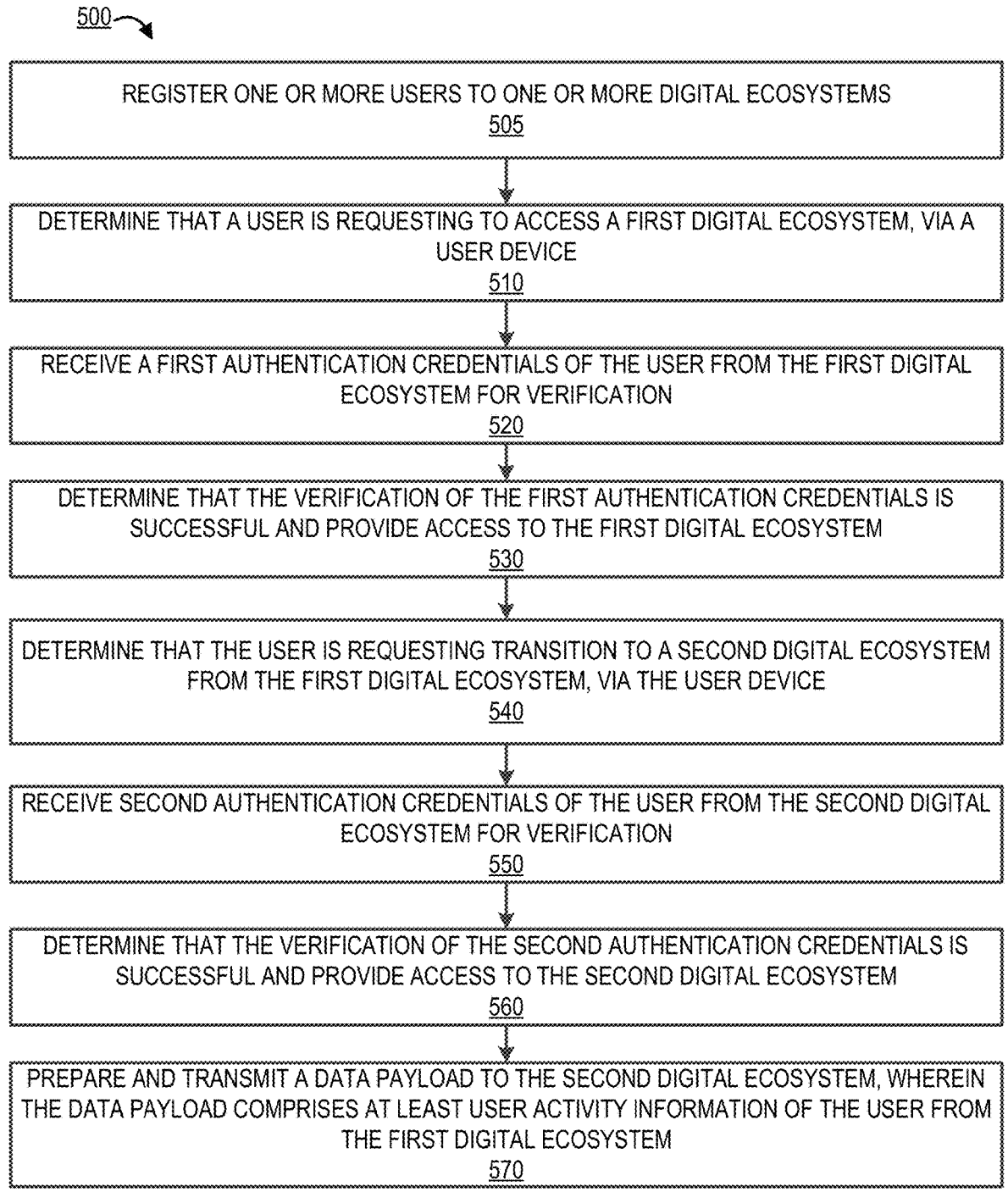
Figure 6:
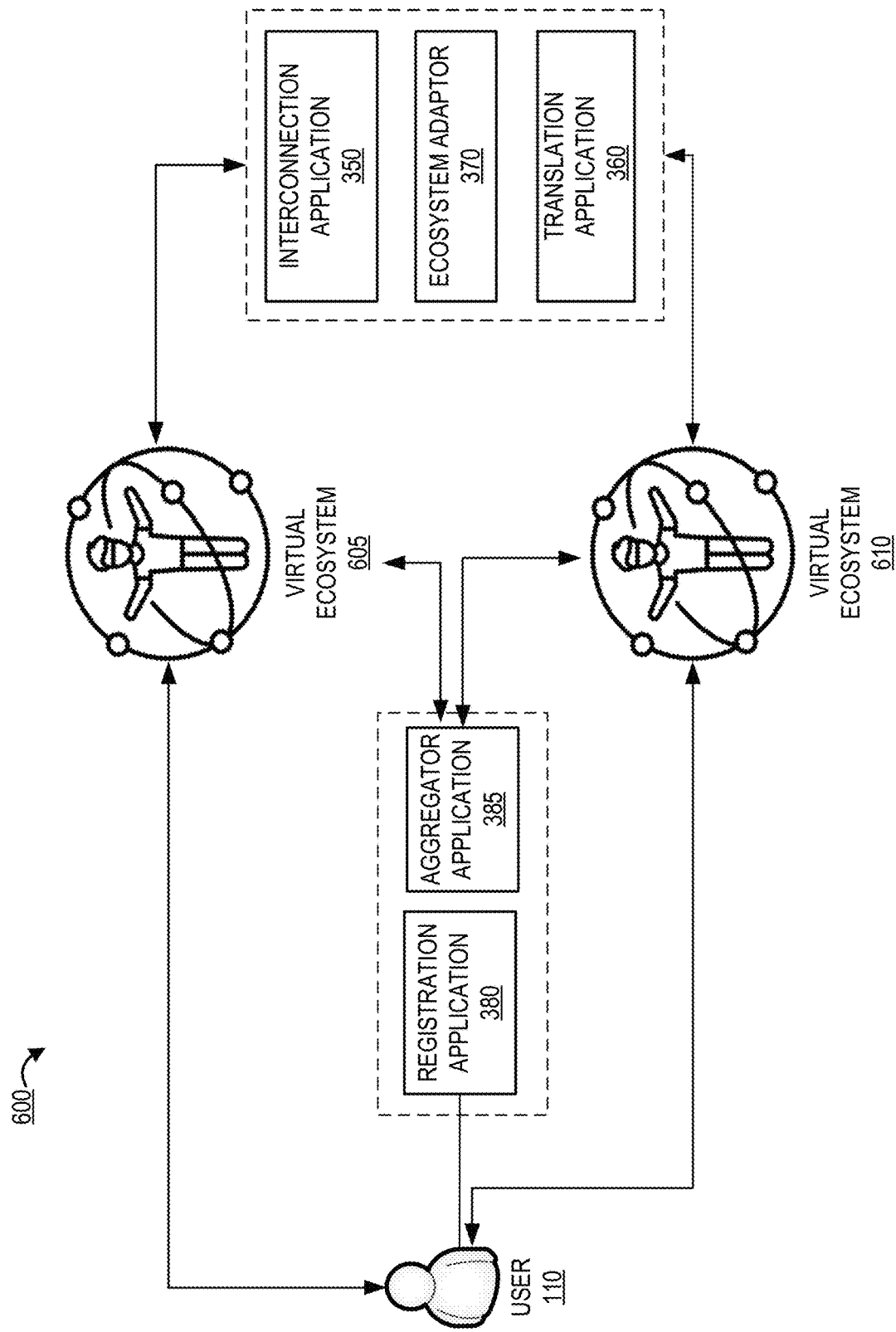

Having thus described embodiments of the invention in general terms, reference will now be made the accompanying drawings, wherein:

FIG. 1 provides a block diagram illustrating a system environment for interconnection, translation, and transition between disparate digital ecosystems, in accordance with an embodiment of the invention;

FIG. 2 provides a block diagram illustrating the entity system 200 of FIG. 1, in accordance with an embodiment of the invention;

FIG. 3 provides a block diagram illustrating an interconnection and transition system 300 of FIG. 1, in accordance with an embodiment of the invention;

FIG. 4 provides a block diagram illustrating the computing device system 400 of FIG. 1, in accordance with an embodiment of the invention;

FIG. 5 provides a process flow for interconnection, translation, and transition between disparate digital ecosystems, in accordance with an embodiment of the invention; and FIG. 6 provides a block diagram illustrating the process for interconnection, translation, and transition between disparate digital ecosystems, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, a digital ecosystem is a hypothetical iteration of the Internet as a single, universal and immersive virtual environment that is facilitated by the use of virtual reality and augmented reality devices. Thus, digital ecosystem provides the ability for a user to associate with an avatar (i.e., a virtual representation/object of the user) and for the avatar to perform one or more actions (e.g., resource exchange events, purchase of products, or the like) within a virtual environment. An example of such a digital ecosystem is a Metaverse.

As described herein, the term "entity" may be any entity registered on a Metaverse to conduct one or more operations. In some embodiments, the entity may be a financial institution which may include herein may include any financial institutions such as commercial banks, thrifts, federal and state savings banks, savings and loan associations, credit unions, investment companies, insurance companies and the like. In some embodiments, the entity may be a non-financial institution such as an auto dealer, retail store, department store, pharmacy, hospital, or the like.

Many of the example embodiments and implementations described herein contemplate interactions engaged in by a user with a computing device and/or one or more communication devices and/or secondary communication devices. A "user", as referenced herein, may refer to a customer of the entity. In some embodiments, the term "user" may refer to a potential customer of the entity. Furthermore, as used herein, the term "user computing device" or "mobile device" may refer to augmented reality devices, virtual reality devices, mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, each entity is registered as a singly operating digital ecosystem and currently no systems exist that allow for interconnection and communication between the individually operating disparate digital ecosystems, thereby making the user transition between the disparate digital ecosystems complicated. Currently, users have to log out of a digital ecosystem and then sign into another digital ecosystem to transition from one virtual environment provided an entity to another virtual environment provided by another entity, which requires higher processing power and memory. As such, there exists a need for a system that allows for interconnection, translation, and transition between disparate digital ecosystems. Embodiments of the present invention address the above needs and/or achieve other advantages by providing a system that allows for interconnection, translation, and efficient transition between disparate digital ecosystems.

FIG. 1 provides a block diagram illustrating a system environment 100 for interconnection, translation, and transition between disparate digital ecosystems, in accordance with an embodiment of the invention. As illustrated in FIG. 1, the environment 100 includes an interconnection and transition system 300, an entity system 200, a computing device system 400, and a virtual environment system 201. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200. In some embodiments, the one or more users 110 may be potential customers of the entity associated with the entity system 200. In some embodiments, the one or more users 110 may not be customers of the entity. In some embodiments, the one or more users 110 may be users of the virtual environment system 201.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that is part of a digital universe, such as a Metaverse.

The virtual environment system 201 may be one or more systems that provide access to one or more digital ecosystems associated with one or more entities and also maintain and manage the one or more digital ecosystems associated with the one or more entities. In some embodiments, the virtual environment system 201 may be a part of the entity system 200, where the entity system 200 provides access, manages, maintains, controls, and/or the like a digital ecosystem associated with the entity. As such, there may be multiple entity systems and/or virtual environment systems associated with the one or more entities that have digital ecosystems set up in the virtual environment.

The interconnection and transition system 300 is a system of the present invention for performing one or more process steps described herein. In some embodiments, the interconnection and transition system 300 may be an independent system. In some embodiments, the interconnection and transition system 300 may be a part of the entity system 200. In some embodiments, the interconnection and transition system 300 may be controlled, owned, managed, and/or maintained by the entity associated with the entity system 200.

The interconnection and transition system 300, the entity system 200, the computing device system 400, and the virtual environment system 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the interconnection and transition system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the interconnection and transition system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution or a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an interconnection and translation application 250, one or more entity applications 270, and a data repository 280 comprising historical transaction data, historical product level data associated with one or more transactions performed by the users, and the like. The one or more entity applications 270 may be any applications developed, supported, maintained, utilized, and/or controlled by the entity. The computer-executable program code of the network server application 240, the interconnection and translation application 250, the one or more entity application 270 to perform certain logic, data-extraction, and data-storing functions of the entity system 200 described herein, as well as communication functions of the entity system 200.

The network server application 240, the interconnection and translation application 250, and the one or more entity applications 270 are configured to store data in the data repository 280 or to use the data stored in the data repository 280 when communicating through the network communication interface 210 with the interconnection and transition system 300, and/or the computing device system 400 to perform one or more process steps described herein. In some embodiments, the entity system 200 may receive instructions from the interconnection and transition system 300 via the interconnection and translation application 250 to perform certain operations. The interconnection and translation application 250 may be provided by the interconnection and transition system 300. The one or more entity applications 270 may be any of the applications used, created, modified, facilitated, developed, and/or managed by the entity system 200.

FIG. 3 provides a block diagram illustrating the interconnection and transition system 300 in greater detail, in accordance with embodiments of the invention. As illustrated in FIG. 3, in one embodiment of the invention, the interconnection and transition system 300 includes one or more processing devices 320 operatively coupled to a network communication interface 310 and a memory device 330. In certain embodiments, the interconnection and transition system 300 is operated by an entity, such as a financial institution. In other embodiments, the interconnection and transition system 300 is operated by a non-financial institution. In some embodiments, the interconnection and transition system 300 is owned or operated by the entity of the entity system 200. In some embodiments, the interconnection and transition system 300 may be an independent system. In alternate embodiments, the interconnection and transition system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the interconnection and transition system 300 described herein. For example, in one embodiment of the interconnection and transition system 300, the memory device 330 includes, but is not limited to, a network provisioning application 340, an interconnection application 350, a translation application 360, an ecosystem adaptor 370, a registration application 380, an aggregator application 385, and a data repository 390 comprising any data processed or accessed by one or more applications in the memory device 330. The computer-executable program code of the network provisioning application 340, the interconnection application 350, the translation application 360, the ecosystem adaptor 370, the registration application 380, and the aggregator application 385 may instruct the processing device 320 to perform certain logic, data-processing, and data-storing functions of the interconnection and transition system 300 described herein, as well as communication functions of the interconnection and transition system 300.

The network provisioning application 340, the interconnection application 350, the translation application 360, the ecosystem adaptor 370, the registration application 380, and the aggregator application 385 are configured to invoke or use the data in the data repository 390 when communicating through the network communication interface 310 with the entity system 200, and/or the computing device system 400. In some embodiments, the network provisioning application 340, the interconnection application 350, the translation application 360, the ecosystem adaptor 370, the registration application 380, and the aggregator application 385 may store the data extracted or received from the entity system 200, and the computing device system 400 in the data repository 390. In some embodiments, the network provisioning application 340, the interconnection application 350, the translation application 360, the ecosystem adaptor 370, the registration application 380, and the aggregator application 385 may be a part of a single application (e.g., modules).

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an interconnection and translation application 421, entity application 424. These applications also typically instructions to a graphical user interface (GUI) on the display 430 that allows the user 110 to interact with the entity system 200, the interconnection and transition system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the interconnection and translation application 421 provided by the interconnection and transition system 300 allows the user 110 to access the interconnection and transition system 300. In some embodiments, the entity application 424 provided by the entity system 200 and the interconnection and translation application 421 allow the user 110 to access the functionalities provided by the interconnection and transition system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart 500 illustrating a process flow for interconnection, translation, and transition between disparate digital ecosystems, in accordance with an embodiment of the invention. As shown in block 505, the system registers one or more users to one or more digital ecosystems. Each of the one or more digital ecosystems may have one or more different type of authentication requirements (e.g., password strength, password length, type of password, type of user ID, type of avatars, and/or the like). As such, the system of the present invention acts as a first layer to allow users to register and gain access to the one or more digital ecosystems. In one embodiment, the system may receive a first set of credentials comprising at least a first user ID, a first avatar, and a first authentication information for accessing a first digital ecosystem from the user, where the first set of credentials meet the authentication requirements set by the first digital ecosystem. For example, an entity associated with the first digital ecosystem may require multi-factor authentication along with a unique user id and an avatar as part of registering the user to the first digital ecosystem. In another embodiment, the system may receive a second set of credentials comprising at least a second user ID, a second avatar, and a second authentication information for accessing the second digital ecosystem from the user. The system may thus receive 'n' set of user credentials from the user for registering into 'n' digital ecosystems. The system aggregates the 'n' set of user credentials by generating a meta ID or a universal ID and tagging each of the 'n' set of user credentials to the meta ID to allow smoother transition of the user from one digital ecosystem to another digital ecosystem. The system store the 'n' set of user credentials tagged to the meta ID in a data repository (e.g., data repository 390).

As shown in block 510, the system determines that a user is requesting to access a first digital ecosystem, via a user device. User device may include any of the virtual reality devices, augmented reality devices, and/or the like. For example, the user may use a virtual reality headset to gain access to a car showroom within a virtual world. In another example, the user may use a virtual glasses to gain access to a pharmacy within a virtual world.

As shown in block 520, the system receives a first authentication credentials of the user from the first digital ecosystem for verification. The user may submit, via the user device, the first set of authentication credentials to a virtual environment system (e.g., virtual environment system 201)/entity system (e.g., entity system 200) associated with the first digital ecosystem. The virtual environment system/entity system associated with the first digital ecosystem may transmit the first authentication credentials received from the user to the system and may prompt the system to verify the first authentication credentials. Upon receiving the first authentication credentials, the system verify that the first authentication credentials match the stored first set of credentials.

As shown in block 530, the system determines that the verification of the first authentication credentials is successful and provides access to the first digital ecosystem. In some embodiments, the system may transmit one or more instructions to the virtual environment system/entity system associated with the first digital ecosystem to allow user to access the first digital ecosystem after successful authentication. In some embodiments, the system may transmit one or more instructions that cause the virtual environment system/entity system associated with the first digital ecosystem to perform one or more operations. After allowing the user to access the first digital ecosystem, the system may continuously monitor user activity within the first digital ecosystem via the virtual environment system/entity system associated with the first digital ecosystem. For example, the system may allow a user to gain access to a car dealership digital ecosystem and may continuously monitor one or more actions of the user in the car dealership digital ecosystem. The system may store the one or more actions of the user in the data repository.

As shown in block 540, the system determines that the user is requesting transition to a second digital ecosystem from the first digital ecosystem, via the user device. For example, the user may request to transition from a car dealership after selecting a car for purchase to a financial institution to secure funding for the purchase of the car. In some embodiments, the system may automatically identify that the user is about to transition to a second digital ecosystem based on determining that the user activity meets one or more triggers. Continuing with the previous example, the system may determine that the user has added a car to a shopping cart and may automatically determine that the user may request to switch to a financial institution to secure funds for purchasing the car. In response to automatically determining the switch, the system may automatically initiate the process of preparing data payload as discussed in block 570 below. In some embodiments, the system receive a notification from the first digital ecosystem (e.g., from the virtual environment system/entity system associated with the first digital ecosystem) that the user would like to switch to a second digital ecosystem to perform a set of actions associated with the activity performed by the user in the first digital ecosystem.

As shown in block 550, the system receives second authentication credentials of the user from the second digital ecosystem for verification. The user may submit, via the user device, the second set of authentication credentials to a virtual environment system (e.g., virtual environment system 201)/entity system (e.g., entity system 200) associated with the second digital ecosystem. The virtual environment system/entity system associated with the second digital ecosystem may transmit the second authentication credentials received from the user to the system and may prompt the system to verify the second authentication credentials. Upon receiving the second authentication credentials, the system verify that the second authentication credentials match the stored second set of credentials associated with the same meta ID linked with the first authentication credentials received in block 520. As shown in block 560, the system determines that the verification of the second authentication credentials is successful and provides access to the second digital ecosystem.

As shown in block 570, the system prepares and transmits a data payload to the second digital ecosystem, wherein the data payload comprises at least user activity information of the user from the first digital ecosystem. The system may generate the data payload in a Metaverse Interface Definition Language (MIDL) format, where the MIDL format allows for efficient translation of data between one or more digital ecosystems. Conventionally, users are registered with different credentials on different digital ecosystems and each digital ecosystem has a different way to perform operations. As such, conventional system do not have the capability to transmit data associated with a user from one digital ecosystem to another ecosystem that can be easily understood by all other digital ecosystems. To solve this, the system may have one or more pieces of software code/executable instructions in virtual environment systems/entity systems associated different digital ecosystems that can read/write data in MIDL format. The system of the present invention monitors user activity of the user in the first digital ecosystem and may transmit data associated with the user activity of the user in the first digital ecosystem to the second digital ecosystem based on the associated meta ID of the user, thereby allowing the user to switch between multiple digital ecosystems to complete an event, where completion of event requires the user performing actions in the multiple digital ecosystems. Continuing with the previous example, where the user has selected a car for purchase at a car dealership within a virtual environment, the system may gather data associated with the car, viz. make, model, price, or the like and may prepare a data payload in MIDL format with the gathered data along with the user's selection of the car at the car dealership and transmit the data payload to one or more financial institutions within the virtual environment, where the financial institutions upon receiving the data payload in MIDL format may read the data and determine whether to grant funding to the user towards purchase of the car from the car dealership. In some embodiments, the system may also gather data associated with the user related to the user activity from one or more other systems. Continuing with the previous example, the system may gather historical financial commitments, remuneration, spending, or the like from other systems and may include the historical financial commitments, remuneration, spending in the data payload.

FIG. 7 provides a block diagram 700 illustrating the process for interconnection, translation, and transition between disparate digital ecosystems, in accordance with an embodiment of the invention. As shown, the user 110 may register to access one or more digital ecosystems via registration application 380 provided by the system. The aggregator application 385 may receive 'n' number of user credentials from the registration application 380 and may aggregate the 'n' number of user credentials and tag them to a meta ID generated for the user 110. Upon successful registration, the user 110 may choose to access the virtual ecosystem 605 via the user computing device 400 by providing a first authentication credentials. The virtual ecosystem 605 upon receiving the first authentication credentials, transmits the first authentication credentials to the aggregator application 385 for verification. The aggregator application 385 verifies that the first authentication credentials meet the credentials provided to the registration application 380 and upon successful verification, the aggregator application 385 transmits a notification to the virtual ecosystem 605, where the virtual ecosystem 605 allows the user 110 to gain access to virtual environment associated with the virtual ecosystem 605. The user 110 may initiate an event (e.g., purchase of a product) in the virtual ecosystem 605 and may request transition to a virtual ecosystem 610 for completing the event.

The user may provide second authentication credentials to the virtual ecosystem 610 and the virtual ecosystem 610 upon receiving the second authentication credentials, transmits the second authentication credentials to the aggregator application 385 for verification. The aggregator application 385 verifies that the second authentication credentials meet the credentials provided to the registration application 380 and are linked to the meta ID associated with the first authentication credentials. Upon successful verification, the aggregator application 385 transmits a notification to the virtual ecosystem 610, where the virtual ecosystem 610 allows the user 110 to gain access to virtual environment associated with the virtual ecosystem 610. As shown, the interconnection application 350 establishes a connection between the virtual ecosystem 605 and the virtual ecosystem 610, the translation application 360 prepares a data payload with data associated with user activity from the virtual ecosystem 605 in an MIDL format, and the ecosystem adaptor 370 transmits the data payload to the virtual ecosystem 610, where the virtual ecosystem 610 uses the data from the data payload and allows the user to complete the event.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for interconnection, translation, and transition between disparate digital ecosystems, the system comprising:
   at least one network communication interface;
   at least one non-transitory storage device; and
   at least one processing device coupled to the at least one non-transitory storage device and the at least one network communication interface, wherein the at least one processing device is configured to:
   register a user in one or more digital ecosystems, wherein registering the user comprises:
      receiving a first set of credentials for accessing a first digital ecosystem of the one or more digital ecosystems from the user;
      receiving a second set of credentials for accessing a second digital ecosystem from the user;
      generating a meta identification (ID) for the user; and
      tagging the first set of credentials and the second set of credentials with the meta ID;
   determine that the user is requesting to access the first digital ecosystem, via a user device;
   receive a first authentication credentials of the user from the first digital ecosystem for a first verification;
   perform the first verification of the first authentication credentials based on the first set of credentials tagged with the meta ID of the user;
   determine that the first verification of the first authentication credentials is successful and provide access to the first digital ecosystem;
   determine that the user is requesting transition to the second digital ecosystem from the first digital ecosystem, via the user device;
   receive second authentication credentials of the user from the second digital ecosystem for a second verification;
   perform the second verification of the second authentication credentials based on the second set of credentials tagged with the meta ID of the user;
   determine that the second verification of the second authentication credentials is successful and provide access to the second digital ecosystem; and
   prepare and transmit a data payload to the second digital ecosystem, wherein the data payload comprises at least user activity information of the user from the first digital ecosystem.

2. The system of claim 1, wherein the at least one processing device is configured to prepare the data payload based on:
   monitoring user activity of the user in the first digital ecosystem;
   storing the user activity as the user activity information;
   communicating with one or more other systems to gather data associated with the user related to the user activity; and
   packaging at least the user activity information and the data gathered from the one or more other systems as the data payload.

3. The system of claim 1, wherein the at least one processing device is configured to prepare the data payload in a Metaverse Interface Definition Language (MIDL) format, wherein the MIDL format allows for translation of data between one or more digital ecosystems.

4. The system of claim 1, wherein the at least one processing device is configured to verify the first authentication credentials based on:
  determining that the first authentication credentials match the first set of credentials tagged with the meta ID of the user.

5. The system of claim 1, wherein the at least one processing device is configured to verify the second authentication credentials based on:
  determining that the second authentication credentials match the second set of credentials tagged with the meta ID of the user.

6. A computer program product for interconnection, translation, and transition between disparate digital ecosystems, the computer program product comprising a non-transitory computer-readable storage medium having computer executable instructions for causing a computer processor to perform the steps of:
  registering a user in one or more digital ecosystems, wherein registering the user comprises:
    receiving a first set of credentials for accessing a first digital ecosystem of the one or more digital ecosystems from the user;
    receiving a second set of credentials for accessing a second digital ecosystem from the user;
    generating a meta identification (ID) for the user; and
    tagging the first set of credentials and the second set of credentials with the meta ID;
  determining that the user is requesting to access the first digital ecosystem, via a user device;
  receiving a first authentication credentials of the user from the first digital ecosystem for a first verification;
  performing the first verification of the first authentication credentials based on the first set of credentials tagged with the meta ID of the user;
  determining that the first verification of the first authentication credentials is successful and provide access to the first digital ecosystem;
  determining that the user is requesting transition to the second digital ecosystem from the first digital ecosystem, via the user device;
  receiving second authentication credentials of the user from the second digital ecosystem for a second verification;
  performing the second verification of the second authentication credentials based on the second set of credentials tagged with the meta ID of the user;
  determining that the second verification of the second authentication credentials is successful and provide access to the second digital ecosystem; and
  preparing and transmitting a data payload to the second digital ecosystem, wherein the data payload comprises at least user activity information of the user from the first digital ecosystem.

7. The computer program product of claim 6, wherein the computer executable instructions cause the computer processor to perform the step of preparing the data payload based on:
  monitoring user activity of the user in the first digital ecosystem;
  storing the user activity as the user activity information;
  communicating with one or more other systems to gather data associated with the user related to the user activity; and
  packaging at least the user activity information and the data gathered from the one or more other systems as the data payload.

8. The computer program product of claim 6, wherein the computer executable instructions cause the computer processor to perform the step of preparing the data payload in a Metaverse Interface Definition Language (MIDL) format, wherein the MIDL format allows for translation of data between one or more digital ecosystems.

9. The computer program product of claim 6, wherein the computer executable instructions cause the computer processor to perform the steps of verifying the first authentication credentials based on:
  determining that the first authentication credentials match the first set of credentials tagged with the meta ID of the user.

10. The computer program product of claim 6, wherein the computer executable instructions cause the computer processor to perform the step of verifying the second authentication credentials based on:
  determining that the second authentication credentials match the second set of credentials tagged with the meta ID of the user.

11. A computer implemented method for interconnection, translation, and transition between disparate digital ecosystems, wherein the method comprises:
  registering a user in one or more digital ecosystems, wherein registering the user comprises:
    receiving a first set of credentials for accessing a first digital ecosystem of the one or more digital ecosystems from the user;
    receiving a second set of credentials for accessing a second digital ecosystem from the user;
    generating a meta identification (ID) for the user; and
    tagging the first set of credentials and the second set of credentials with the meta ID;
  determining that the user is requesting to access the first digital ecosystem, via a user device;
  receiving a first authentication credentials of the user from the first digital ecosystem for a first verification;
  performing the first verification of the first authentication credentials based on the first set of credentials tagged with the meta ID of the user;
  determining that the first verification of the first authentication credentials is successful and provide access to the first digital ecosystem;
  determining that the user is requesting transition to the second digital ecosystem from the first digital ecosystem, via the user device;
  receiving second authentication credentials of the user from the second digital ecosystem for a second verification;
  performing the second verification of the second authentication credentials based on the second set of credentials tagged with the meta ID of the user;
  determining that the second verification of the second authentication credentials is successful and provide access to the second digital ecosystem; and
  preparing and transmitting a data payload to the second digital ecosystem, wherein the data payload comprises at least user activity information of the user from the first digital ecosystem.

12. The computer implemented method of claim 11, wherein preparing the data payload comprises:
  monitoring user activity of the user in the first digital ecosystem;
  storing the user activity as the user activity information;
  communicating with one or more other systems to gather data associated with the user related to the user activity; and packaging at least the user activity information and the data gathered from the one or more other systems as the data payload.

13. The computer implemented method of claim 11, wherein the method further comprises preparing the data payload in a Metaverse Interface Definition Language (MIDL) format, wherein the MIDL format allows for translation of data between one or more digital ecosystems.

14. The computer implemented method of claim 11, wherein verifying the first authentication credentials comprises determining that the first authentication credentials match the first set of credentials tagged with the meta ID of the user.

15. The computer implemented method of claim 11, wherein verifying the second authentication credentials comprises determining that the second authentication credentials match the second set of credentials tagged with the meta ID of the user.

16. The computer implemented method of claim 11, wherein the first set of credentials comprises at least a first user ID, a first avatar, and a first authentication information.

17. The computer implemented method of claim 11, wherein the second set of credentials comprises at least a second user ID, a second avatar, and a second authentication information.

18. The system of claim 1, wherein the first set of credentials comprises at least a first user ID, a first avatar, and a first authentication information.

19. The system of claim 1, wherein the second set of credentials comprises at least a second user ID, a second avatar, and a second authentication information.

20. The computer program product of claim 6, wherein the first set of credentials comprises at least a first user ID, a first avatar, and a first authentication information and the second set of credentials comprises at least a second user ID, a second avatar, and a second authentication information.

* * * * *